United States Patent [19]

Hutt et al.

[11] 4,394,687

[45] Jul. 19, 1983

[54] APPARATUS FOR DECODING DIGITAL INFORMATION PROCESSED FOR INCLUSION IN WIDE BAND T.V. VIDEO SIGNAL

[76] Inventors: Peter R. Hutt, Stoner End, Froxfield, Petersfield, Hampshire; John J. Moyce, 21 Culver Rd., Newbury, Berkshire, both of England

[21] Appl. No.: 227,050

[22] PCT Filed: Apr. 30, 1980

[86] PCT No.: PCT/GB80/00078

§ 371 Date: Dec. 30, 1980

§ 102(e) Date: Dec. 30, 1980

[87] PCT Pub. No.: WO80/02489

PCT Pub. Date: Nov. 13, 1980

[30] Foreign Application Priority Data

Apr. 30, 1979 [GB] United Kingdom ............... 7914977

[51] Int. Cl.³ ........................................... H04N 7/08
[52] U.S. Cl. ................................................ 358/147
[58] Field of Search ............. 358/141, 142, 146, 147, 358/188

[56] References Cited

U.S. PATENT DOCUMENTS 3,961,137  6/1976  Hutt et al. ........................... 358/147
3,982,065  9/1976  Barnaby et al. ..................... 358/147

OTHER PUBLICATIONS

British Kinematography Sound and Television, vol. 55, No. 9, Sep. 1973.

Primary Examiner—Robert L. Richardson
Attorney, Agent, or Firm—Watson, Cole, Grindle & Watson

[57] ABSTRACT

Digital information signals representing information to be displayed on a television receiver are received separate from the wide band video signals and stored for display in a predetermined number of rows and columns. The digital information signals are displayed in predetermined number of rows and columns of characters with the information signals being transmitted in lines, each of which contain data relating to a number of characters less than the predetermined number of columns in the display. The control code is also transmitted in the digital information signals and extracted to control the storage addressing of the digital information signals in a storage device by appropriate row and column addresses.

7 Claims, 12 Drawing Figures

| | ROW ADDRESS | CONTINUITY CODE | | ONE DATA LINE (32 CHARACTERS OF TEXT) | | | | |
|---|---|---|---|---|---|---|---|---|
| | | TAB NUMBER | SEQ FLAG | 1 | 8 | 16 | 24 | 32 |
| (a) | 23 | 3 | 1 | R O W | R O W 2 2 d | R O W 2 2 e | R O W 2 3 a | R O W 2 3 b |
| (b) | 23 | 2 | 0 | R O W | R O W 2 3 c | R O W 2 3 d | R O W 2 3 e | R O W 2 3 a |
| (c) | 00 | 0 | 0 | PAGE HEADER CONTROL BYTES | | 1 4 : 1 0 / 1 5 M O N 0 4 A P R P 1 0 1 | | |
| (d) | 00 | 0 | 0 | PAGE HEADER CONTROL BYTES | | 1 4 : 1 0 / 1 5 M O N 0 4 A P R P 1 0 1 | | |
| (e) | 02 | 4 | 1 | T E L E T E X T | R O W 0 2 d | R O W 0 2 e | R O W 0 2 b | R O W 0 2 c |
| (f) | 03 | 3 | 0 | R O W | R O W 0 3 c | R O W 0 3 d | R O W 0 3 a | R O W 0 3 b |
| (g) | 05 | 2 | 1 | R O W | R O W 0 5 b | R O W 0 3 e | R O W 0 3 e | R O W 0 5 a |
| (h) | 05 | 1 | 0 | R O W | R O W 0 5 b | R O W 0 5 c | R O W 0 5 d | R O W 0 5 e |
| (i) | 06 | 0 | 1 | R O W | R O W 0 6 a | R O W 0 6 a | R O W 0 6 c | R O W 0 6 d |
| (j) | 06 | 4 | 0 | R O W | R O W 0 6 e | R O W 0 6 a | R O W 0 6 b | R O W 0 6 c |
| (k) | 00 | 0 | 0 | PAGE HEADER CONTROL BYTES | | 1 4 : 1 0 / 1 5 M O N 0 4 A P R P 1 0 1 | | |
| (l) | 07 | 0 | 1 | R O W | R O W 0 7 a | R O W 0 7 b | R O W 0 7 c | R O W 0 7 d |
| (m) | 08 | 4 | 0 | R O W | R O W 0 7 e | R O W 0 8 a | R O W 0 8 b | R O W 0 8 c |

END OF PREVIOUS PAGE } (a)–(b)

FIRST PART OF PAGE 101 } (c)–(m)

*Fig. 3.*

| ROW ADDRESS | COLUMN NUMBER | | | | |
|---|---|---|---|---|---|
| | 8 | 16 | 24 | 32 | 40 |
| 00 | 14:10/15 | MON 04 | APR P101 | TELETEXT | |
| 01 | | | | | |
| 02 | ROW 02a | ROW 02b | ROW 02c | ROW 02d | ROW 02e |
| 03 | ROW 03a | ROW 03b | ROW 03c | ROW 03d | ROW 03e |
| 04 | | | | | |
| 05 | ROW 05a | ROW 05b | ROW 05c | ROW 05d | ROW 05e |
| 06 | ROW 06a | ROW 06b | ROW 06c | ROW 06d | ROW 06e |
| 07 | ROW 07a | ROW 07b | ROW 07c | ROW 07d | ROW 07e |
| 08 | ROW 08a | ROW 08b | ROW 08c | ROW 08d | ROW 08e |
| 09 | | ETC. | | | |

APPARATUS FOR DECODING DIGITAL INFORMATION PROCESSED FOR INCLUSION IN WIDE BAND T.V. VIDEO SIGNAL

FIELD OF THE INVENTION

The present invention relates to television systems and more particularly to a method and apparatus for decoding digital information processed for inclusion in a wide band T.V. video signal.

BACKGROUND OF THE INVENTION

In any normal television system, the transmission of the wide band video signals which are to produce the actual picture elements on the screen of the receiver, is interrupted between the scanning periods for line and field synchronisation purposes. Consequently there are periods during which no video signals are being transmitted. It is now possible to use these periods for the transmission of data which is not necessarily concerned with the video transmission itself.

Basically, data representable by standard graphical symbols such as alpha-numeric symbols can be transmitted via a restricted channel provided that the rate of transmission is restricted. It is now possible to use periods as aforesaid especially the line times of the field blanking intervals (i.e. the times of the individual lines occurring between fields which correspond with the times occupied by video signals on active picture lines), for the transmission of pages of data. Typically, using 8-bit digital signals representing alpha-numeric characters at a bit rate of 2.5 M bit per second, 50 pages of data each consisting of 22 strips of 40 characters can be transmitted repeatedly in a total cycle time of 90 seconds using only a single line of the field blanking period per field of the 625 line system as operated in the United Kingdom.

Data transmission as described above is already commercially available in the United Kingdom under the name "Teletext."

It is generally accepted that teletext displays should consist of 40 characters per row and ideally for international compatibility 24 rows per page. The U.K. teletext transmission standard specified a data rate of 6.9375 Mbits per second (which has proven to be at the upper reasonable limit of transmission rate for system I, B/G system) so as just to achieve transmission of a complete row of text on one video line of the field blanking time.

The advantage of conveying one row of text on one video line is to achieve maximum economy in requirements for transmission of addressing information needed to correctly position the text information on the displayed page. Since whole rows of text are transmitted on each line, only a row number need be transmitted with each data line of text. Row zero which acts as the page demarcation signal requires additional page numbering information and also incorporates various display and interpretation codes appropriate to the particular page. In order to facilitate parallel magazine working every row of text also incorporates a 3 bit magazine number, being the most significant digit of the page number.

The above structure incorporating as it does one text row on every data line thus results in a very efficient utilization of the transmission facility. Inherent in this teletext transmission system, as just described, is its fixed format nature. Fixed format does not necessarily mean that a certain position of a code on a data line must correspond to a certain position of that character on the screen. When 40 characters are transmitted on a data line however, as in U.K. teletext, it does. Fixed format, more generally, means that each of the 40 character positions on the display screen have been "occupied" by the transmission of one and only one transmission code or alternatively every transmitted character or control code occupies one position on the display screen or equivalently in the display memory. The consequences of fixed format are economy in receiver storage and easy integration towards an error free display in the event of a moderate reception bit error probability.

A further attribute of Teletext is synchronism. By synchronism is meant the fact that control and address codes are synchronized in time to the horizontal sync pulses of the TV system. This means that the teletext decoder has prior knowledge of the position of the control and row address codes with respect to their occurrence relative to the TV sync pulse. These codes do not have to be "sorted out" from a mixed sequence of text and addressing information. In U.K. teletext the hamming-protected addressing control codes are put as soon as possible after line sync near the beginning of the data line signal. This position is directly after the three-byte preamble achieving bit and byte sync of the data receiver; in this position they can never be confused with text information. With U.K. teletext where one row of text occupies one data line this is the obvious and natural way of achieving synchronism.

It is important to note that synchronism, in general, does not mean that one row of text is conveyed by one data line. This latter attribute may be termed "row integrity." Row integrity is achieved by the U.K. teletext system where exactly the contents of one 40-character row of text are transmitted by one data line.

Row integrity is not necessarily a factor which leads to transmission security or easy integration towards error free reception. Row integrity is desirable for economy of address transmission and simplicity of decoder design. But a system without row integrity can still be fixed format and synchronous yet be only minimally more complex than a system like U.K. teletext which possesses all three attributes; row integrity, fixed format and synchronism.

Where the prime request is for a 40-character row yet the TV system is of insufficient bandwidth to allow enough bits per video line to convey 40 characters per line, then row integrity is not possible. A system without row integrity will be described which represents minimal departure from the U.K. teletext system.

SUMMARY OF THE INVENTION

The present invention provides a television system for receiving a digital information signal which has addressing information additionally to that already provided for commercially available teletext. Preferably, the additional addressing information comprises one extra Hamming protected code word per data line for identifying the horizontal location of the information.

BRIEF DESCRIPTION OF THE DRAWINGS

Features and advantages of the present invention will become apparent from the following description of embodiments thereof given by way of example with reference to the accompanying drawings, in which:

FIG. 3 shows a further plurality of data lines showing a typical sequence of data lines;

FIG. 4 shows how the data contained in the data lines shown in FIG. 3 would be displayed on a receiver;

DETAILED DESCRIPTION

Figure 1:
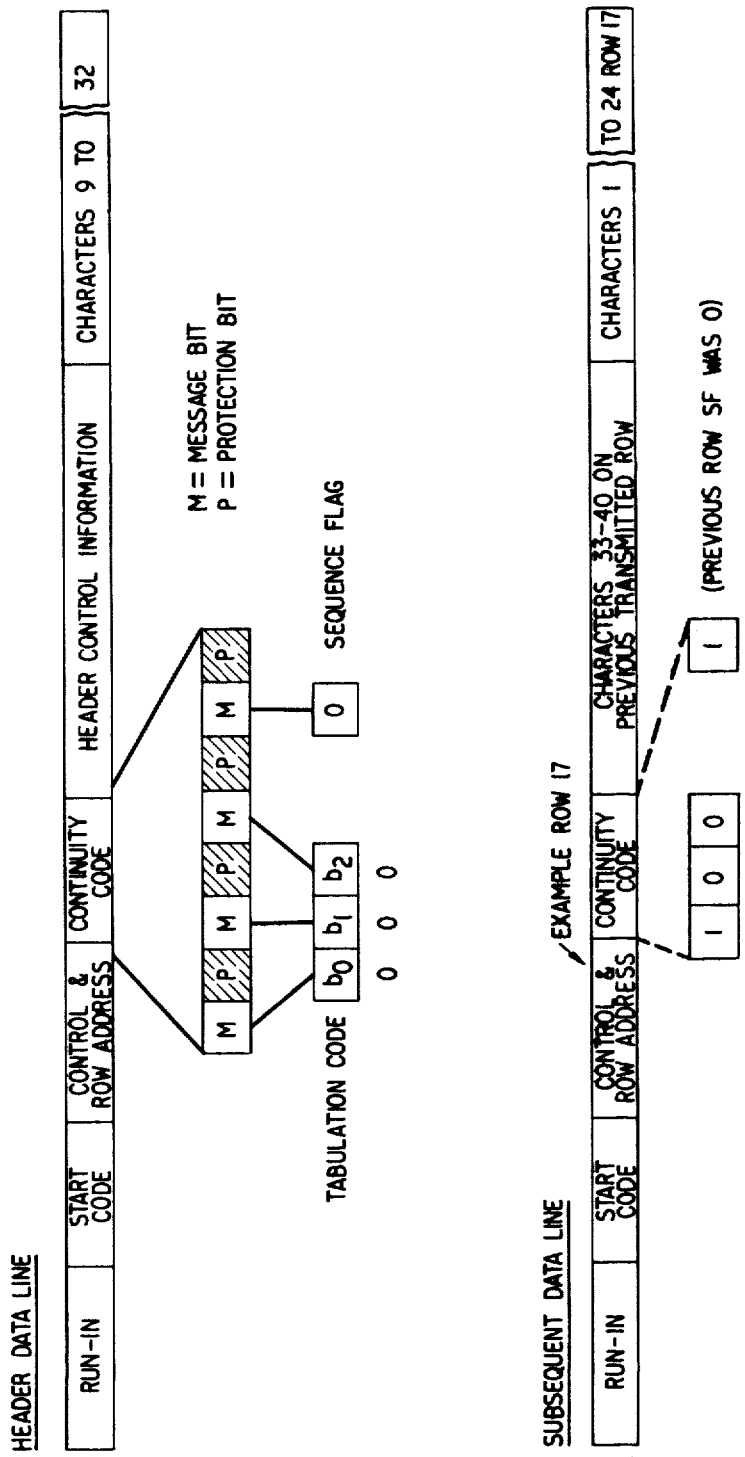
FIG. 1 shows in diagrammatic form two data lines of a data transmission according to the present invention.
Figure 2:
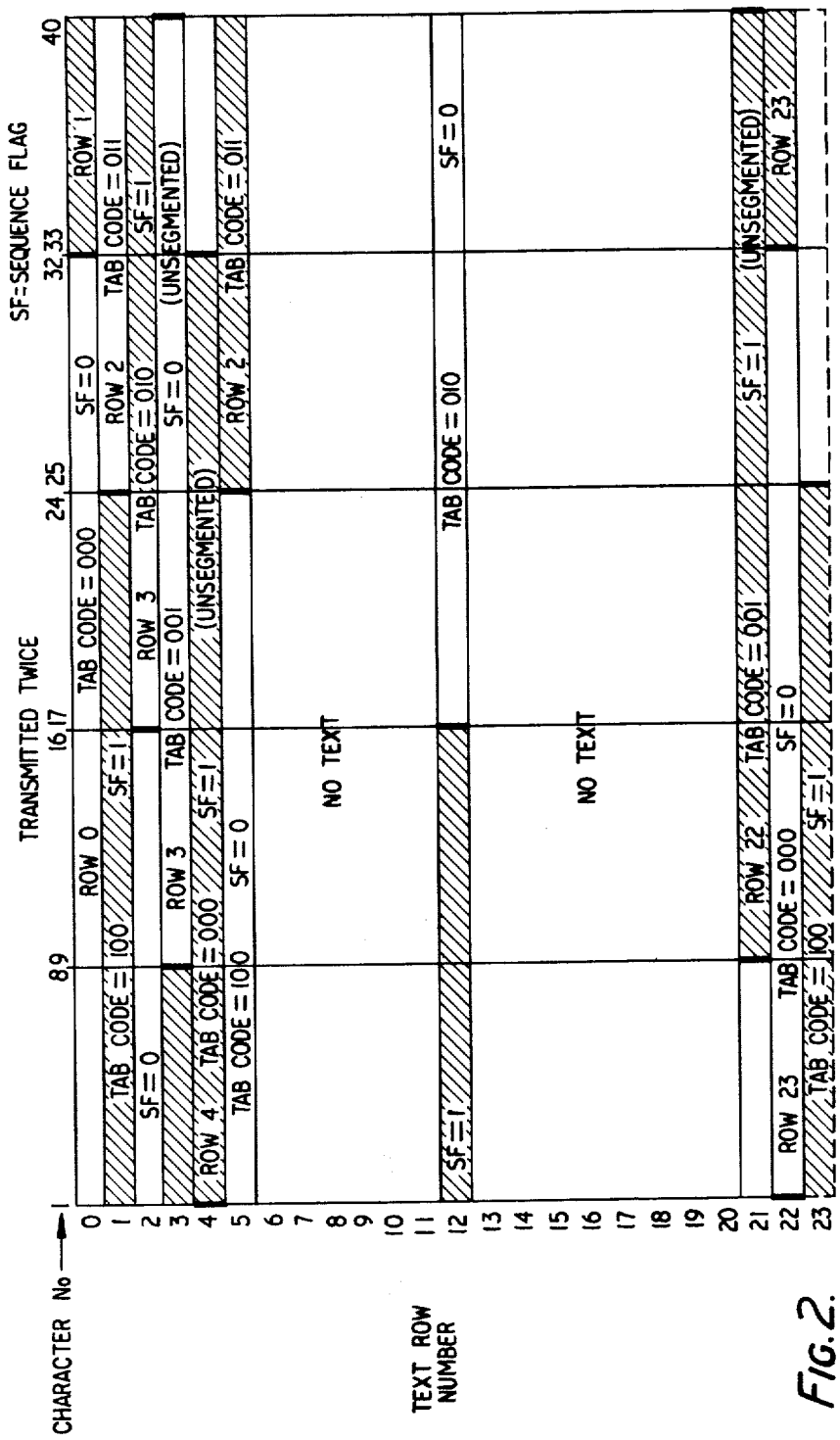
FIG. 2 shows a plurality of data lines but assembled to show how they produce a character display.

A specific embodiment of the invention will now be described.

Assume it is desired to achieve a 40 character display row and the number of characters transmittable per data line is less than 40. Failure to acquire one data line is not to affect the correct positioning of a subsequent data line of characters so each data line of characters must contain in addition to a row address also a code indicative of the correct positioning of that data line within a particular row. However since there is now no row-integrity a data line of characters can be positioned partially on one row and partially on another.

The answer to the problem is a tabulation code which is indicative of the horizontal position across the page at where the data line of characters is to be positioned. The apparatus to be described enables one transmitted data line to carry information relating to parts of two rows of the display. If the previous displayed row is not yet completed these characters are inserted in memory to continue to the end of the uncompleted and last-received row. At this point the remaining characters on the current data line are inserted in memory on the row corresponding to the row address of the currently received data line. Thus the single row address with each data line refers to a 'second portion' of characters conveyed by the data line. The 'first portion' when present, is for the completion of the so far partially-complete transmission of a previous text row.

One problem remains. When the previous data line has failed to be acquired then the first portion must not be put on the wrong place on the page. Various forms of receiver logic can guard against this so that if the tabulation code does not correspond to that expected to complete an incomplete text row then the first portion can be discarded, the second portion still being used to start the new row given by the row address. A very simple receiver logic is made possible by incorporating a sequence flag. This is a single bit which alternates between zero and one on consecutive data lines. If alternation is not observed on a newly received data line then the first portion is discarded.

Continuity code is the name given to the code comprising both the information necessary for tabulation and sequencing. In many cases this code need consist of four bits or less. The precise form of the code depends on the data rate chosen which in turn dictates the number of text characters per data line.

If we take the number of characters per data line as N then a data line can start at a number of positions across the page. This number of positions depends on the precise value of N. The number of positions, P, is given by the quotient of 40 and the highest common factor of N and 40. Thus for a system transmitting 32 characters per data line, the highest common factor is 8, P is thus 5. The page of text has five tabulations on characters 1, 9, 17, 25, 33. Thus a tabulation code in this case requires 3 bits correctly to tabulate the horizontal display position of the 32 characters conveyed by the data line. Table 1 shows the number of tab. positions required for N being between 40 and 20 characters per data line, as well as the number of bits required to represent the number P.

TABLE 1

| Characters per Data Line, N | No. of Tab. Position, P | No. Bits for Tab. Code |
|---|---|---|
| 40 | 1 | 0 |
| 39 | 40 | 6 |
| 38 | 20 | 5 |
| 37 | 40 | 6 |
| 36 | 10 | 4 |
| 35 | 8 | 3 |
| 34 | 20 | 5 |
| 33 | 40 | 6 |
| 32 | 5 | 3 |
| 31 | 40 | 6 |
| 30 | 4 | 2 |
| 29 | 40 | 6 |
| 28 | 10 | 4 |
| 27 | 40 | 6 |
| 26 | 20 | 5 |
| 25 | 8 | 3 |
| 24 | 5 | 3 |
| 23 | 40 | 6 |
| 22 | 20 | 5 |
| 21 | 40 | 6 |
| 20 | 2 | 1 |

TABLE 2

| Characters/Data Line Tab. Code 4 Bits or Less | No Bits |
|---|---|
| 40 | 0 — |
| 36 | 4 * |
| 35 | 3 * |
| 32 | 3 * |
| 30 | 2 * |
| 28 | 4 — |
| 25 | 3 — |
| 24 | 3 — |
| 20 | 1 * |

TABLE 3

| Characters/Data Line Tab. Code 3 Bits or Less | No Bits |
|---|---|
| 40 | 0 — |
| 35 | 3 * |
| 32 | 3 * |
| 30 | 2 * |
| 25 | 3 — |
| 24 | 3 — |
| 20 | 1 * |

*Tabulation code decrements uniformly.

Table 2 shows the values of N where the tab. code conveniently requires four bits or less and shows the relatively well spread nature of the values of N. Table 3 shows the values of N where three bits or less are required leaving room for a sequence flag to bring the total bits required up to no more than 4 bits. The values of N in Table 3 are thus preferred for maximum economy and effectiveness in using one extra 4—4 hamming-protected "Continuity Code" word in the data line. Note that the asterisks in Tables 2 and 3 are explained fully in a later section; they indicate when the appropriate tabulation code decrements uniformly.

Position of Continuity Code

The continuity code is always positioned as an extra word in each data line directly after the position corresponding to the control and row-address group as transmitted in UK teletext transmission. This position maintains the synchronism of a tabulated teletext transmission standard.

TEXT TRANSMISSION ROUTINE

Row Ordering

In UK teletext rows can be transmitted in any order though in practice they are always transmitted sequentially. In a non-integral or tabulated teletext system rows of text can also be transmitted in any order.

Page Completion

The final row of text transmitted on a page may require only a first portion of the final data line. This leaves the second portion requiring to be filled with character information. The most favourable means of doing this is to give the final data line the row address of the last transmitted text row and to retransmit the left hand side of the final text row as the second portion of the data line. FIG. 3(b) and (j) illustrates this point.

Page Header

Page headers should be transmitted twice in succession for additional security of page demarcation as in UK teletext. The page headers always comprise eight page-header control bytes (which are not displayed) followed by the first N-8 display characters of text row zero. The remaining characters for display in text row zero are transmitted as the first portion of the next data line. The whole of text row zero is 'transparent' in UK teletext; the same facility is achievable in a segmented teletext system provided the first portion of the first non-zero-address data-line of every page is displayed in addition to the page header on text row zero. FIG. 3(c), (d) and (e) illustrates this point further.

In UK teletext page headers may be interspersed into the sequence of data lines carrying rows of text so as to increase accuracy of the time of day display. To do this in a tabulated system requires that the text row which is currently being transmitted must be terminated before the interrupting page header is transmitted. The means for terminating a row of text has already been described in the section, Page Completion. See FIG. 3(j), (k) and (l).

Adaptiveness

In UK teletext only rows containing text information are usually transmitted. In a tabulated system the same facility can be employed.

It is possible to transmit just one data line for a row of text if the text on a row happens to fall within the appropriate tabulation points if the continuity code incorporates a sequence flag. However it is believed best not to allow such a transmission facility in the interests of transmission system simplicity and simplicity of decoder design. Data transmission savings would be minimal.

Thus in a tabulated system any row containing text is transmitted complete treating spaces in that row as definite transmission characters.

Sequence Flag

The sequence flag if incorporated in the chosen continuity code is transmitted at zero on all page headers and alternates between zero and one on all data lines up to the last data line for the page. If an interrupting page header occurs the sequence flag is set to zero for that page header, the sequence flag then continues to alternate from zero.

AN EXAMPLE OF A 32 CHARACTER PER LINE TELETEXT TRANSMISSION SYSTEM FOR SYSTEM M N

FIG. 1 illustrates the data line structure for the particular case of 32 characters per data line for a 40 character per row display. The form of all data lines is substantially the same as for UK teletext except for the addition of the continuity code directly after the control and row address group. Note how very similar the structure is to the UK teletext reflecting the manner in which such a system preserves most virtues of UK teletext.

FIG. 3 illustrates how data lines are transmitted to constitute a page of text. The code requires 3 bits to indicate the five tabulation positions. In some instances two different data lines having the same row address but different tabulation codes are transmitted in sequence. The fourth bit of the continuity code is used as a sequence flag which may be used by decoders to confirm that the first portion of a segmented data line should be put on the same row as the previously received row address. Thus a tab. code of 011 in row 12 indicates that the data of the first portion of row 12 should be inserted on row 5 starting after the third tab. position. Since each row consists of five 'segments' of 8 characters each, the first two segments, or 16 characters are used to fill the remainder of row 5. At this position the decoder jumps to row 12 given by the row address and places the remaining 16 characters into the first two display segments of row 12.

Should the row 5 data line not have been acquired then the sequence flag will not be alternating. In this case only the second portion of row 12 is utilised to load the display memory. In this particular system the loss of one data line can cause a maximum loss of 1 2/5 text display rows.

In a 32 character per data line system it can be seen that the tab. code decrements from 000 up to 100, 011, 010, 001, 000 and repeats again in a uniform cyclic manner. Such a feature can be used in decoders instead of a sequence flag; it occurs thus because the difference between 40 and 32 is equal to the segment length. This feature can be seen to apply for most but not all data-line lengths in Tables 2 and 3 and is indicated by an asterisk where the feature applies. Only the fairly low values of N, 28, 25 and 24 do not in fact display it.

Nevertheless the use of the sequence flag is seen as a simplification in receiver design, it being most unlikely to lose two consecutive data lines unless reception conditions are giving an unuseable character error rate.

Figure 5:
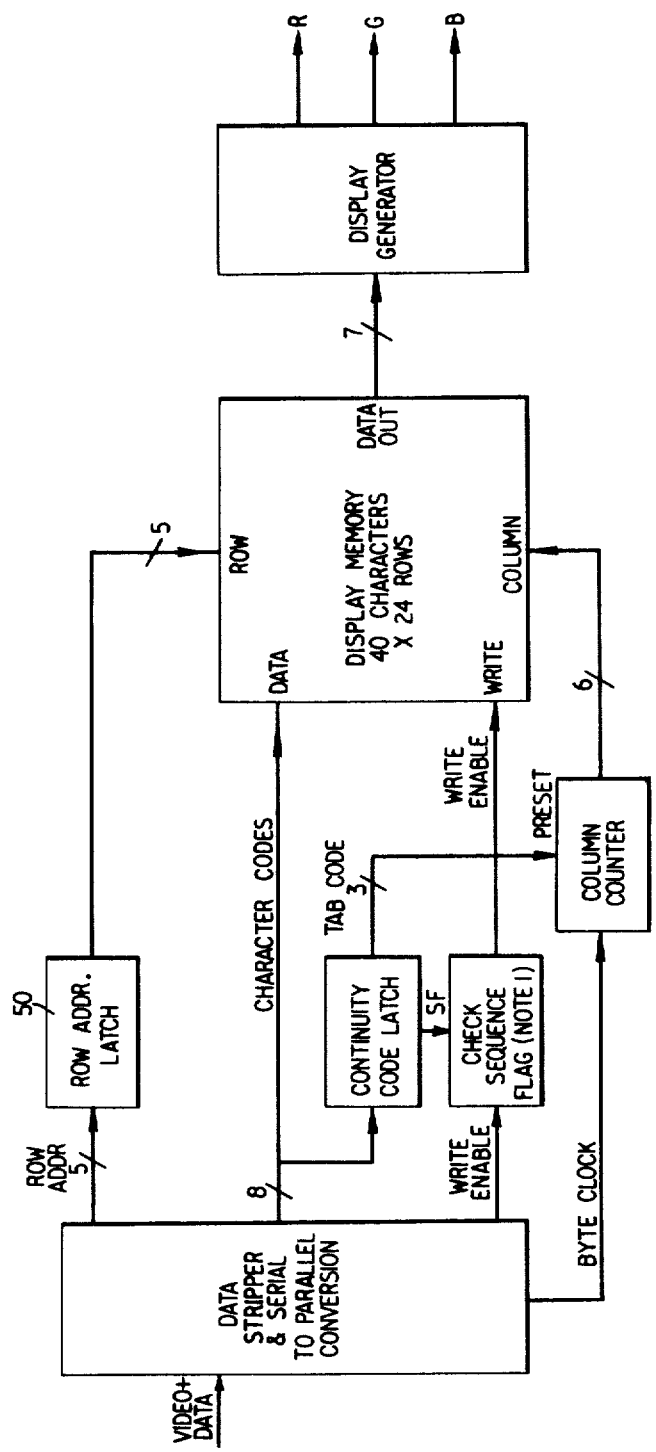
FIG. 5 shows a block diagram of a decoder circuit.

FIG. 5 is a schematic depicting the extra circuit blocks or functions required to receive teletext transmissions of the tabulated type. The front end is similar to the UK teletext decoder as is the circuitry including page storage and display. Only the memory loading circuitry requires some additional functions. Briefly these are as follows.

The memory loading circuitry requires to maintain its previous row address if the row of text is not completed. Thus a row address latch 50 memorises the new row address until required. The character byte counter may either continue where it stopped on the previous data line or if the sequence check is unsuccessful then the character counter is reset in accordance with the three-bit tabulation code provided by the continuity code latch.

In all cases the row counter is reset to the new row code when the character counter overflows from 40 to 1 or is static at position 1 in the case of row completed by the previous data line.

Figure 6:
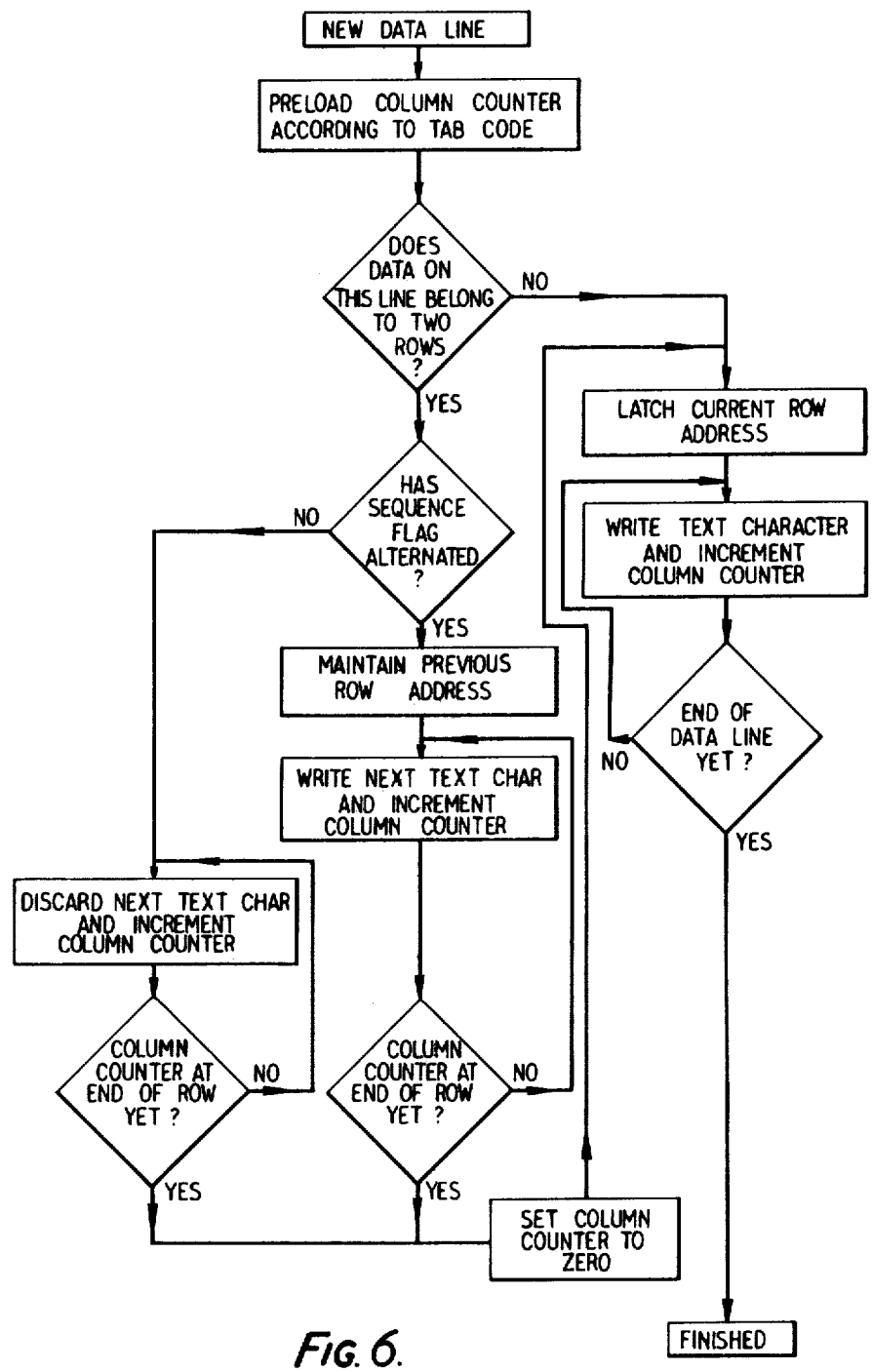
FIG. 6 shows a flow chart for aiding understanding of the operation of the decoder.
Figure 7:
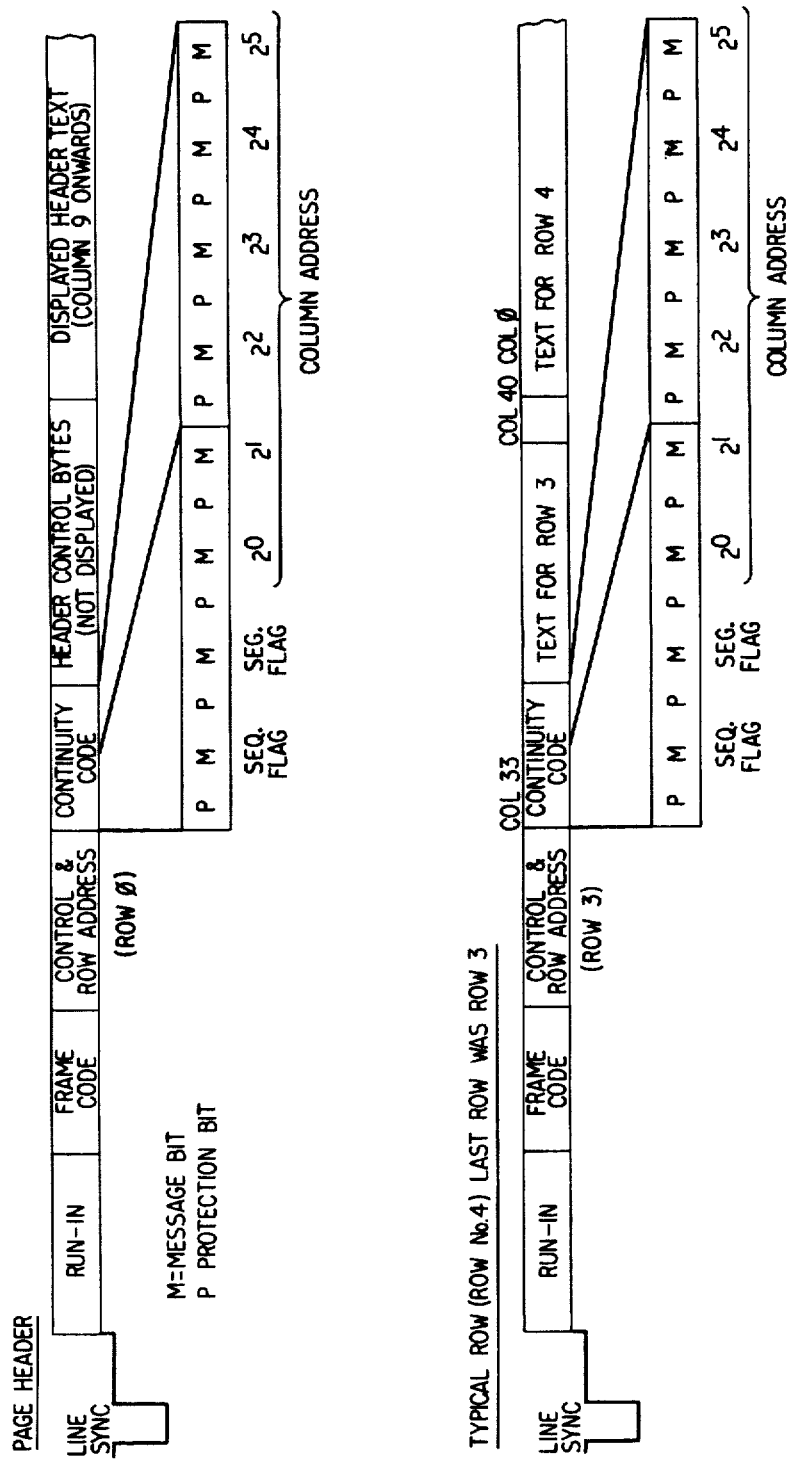
FIG. 7 shows a plurality of data lines similar to FIG. 2 but for a more general embodiment of the invention.

Various arrangements of decoding circuitry are possible. FIG. 5 is intended only to give broad principles. FIG. 6 is a flow chart illustrating the logical operations performed by a data decoder receiving tabulated teletext.

ADVANTAGES OF A TABULATED TELETEXT SYSTEM

The algorithm for transmitting tabulated teletext remains the same no matter how many characters per data line are transmitted and how many characters comprise a row of text.

Only one 4 bit hamming protected word is required per data line to transmit the tabulation information in preferred cases.

A simple and flexible transmission routine allows easy experimentation with different data rates or equivalently numbers of characters per data line.

The decoder complexity is only very slightly greater than that for a row-integral teletext system. A decoder could be constructed which could be suitable to a selection of values of characters per data line to facilitate experimentation at different data rates.

Tabulated teletext transmits only complete rows of text. It is thus a transmission system which (in common with UK teletext) saves maximum transmission time by row adaptive transmission. This is particularly true of subtitles.

Changes in design of UK decoders so as to allow them to work on a tabulated teletext standard using 40 characters per row of text are minimal.

GENERAL TABULATED TELETEXT SYSTEM

It is possible to specify a general system which caters for a wide range of characters per data line and characters per text row. This requires an 8-bit Continuity Code, which would allow up to 64 characters per text row. The decoder logic does not then depend on the number of characters per data line.

CONTINUITY CODE

This 8-bit number is split into three; a 6-bit column address, a 1-bit segmentation flag, and a 1-bit sequence flag. Their functions are as follows.

Column Address:

This 6-bit number is transmitted on every data line and gives the column number (in the range 1–64) of the first text character in the data line. The row address of this first text character could be either the row address specified at the beginning of the data line, or the row address specified by the previous data line, depending on the state of the segmentation flag.

Segmentation Flag:

If this is a 'zero,' all the text on the current data line is addressed by the specified row number. If this flag is a 'one,' then the data line is segmented, and the first portion of the data line is addressed by the previous row number, while the second portion is addressed by the row number at the beginning of the data line. In this case, the sequence flag must also be examined.

Sequence Flag:

This flag bit alternates between 'one' and 'zero' on alternate data lines (except the page header which resets the flag to zero). The sequence flag must be checked in a segmented data line, as the previous row address is required for the first portion of the data line. If the sequence flag has not alternated, then the previous data line must have been lost, along with its row address. Hence the first portion of the current data line must be discarded.

SPECIAL CASE SYSTEMS

Figure 8:
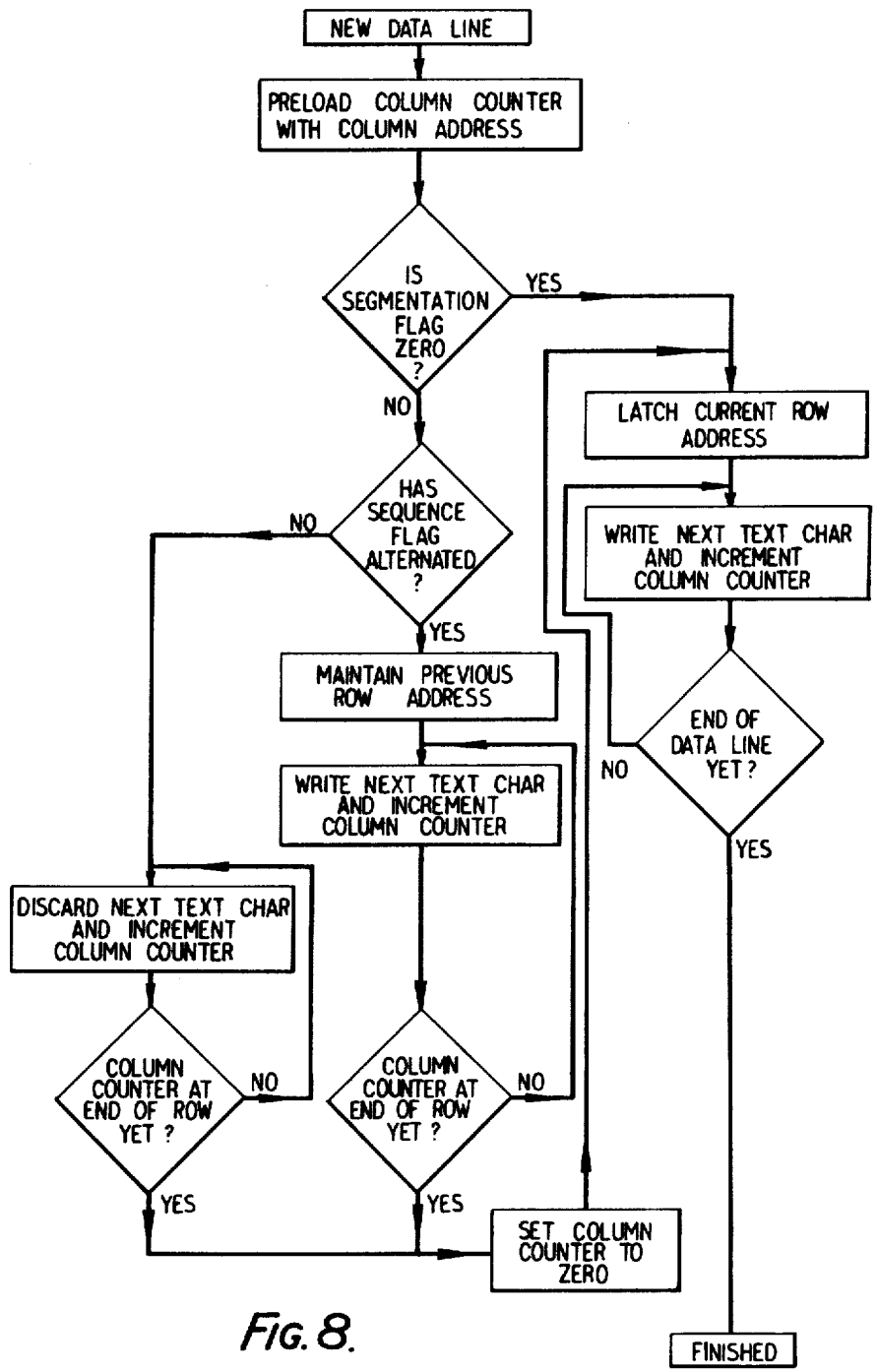
FIG. 8 shows a flow chart similar to FIG. 6 but for the more general embodiment of the invention.

Given a specified number of characters per text row, the above system will work for any number of text characters per data line, provided this is less than the number of characters per text row. A flow chart for the receiver logic to decode such a system is shown in FIG. 8.

The proposed USA teletext specifications are special cases of this general one, but optimised by choosing the number of characters per text row and per data line, such that only a limited number of column addresses are possible (tab. positions). It requires less bits to transmit a tab. code than the 6 required for a column address. However, the receiver logic will be unique for each system, and not common to all systems.

The UK teletext system is an even more special case of this general system, in that there is only one possible tab. position, since the numbers of characters per text row and per data line are both the same. This gives a system with Row Integrity, and which does not require a column address or tab. code.

Figure 9A:
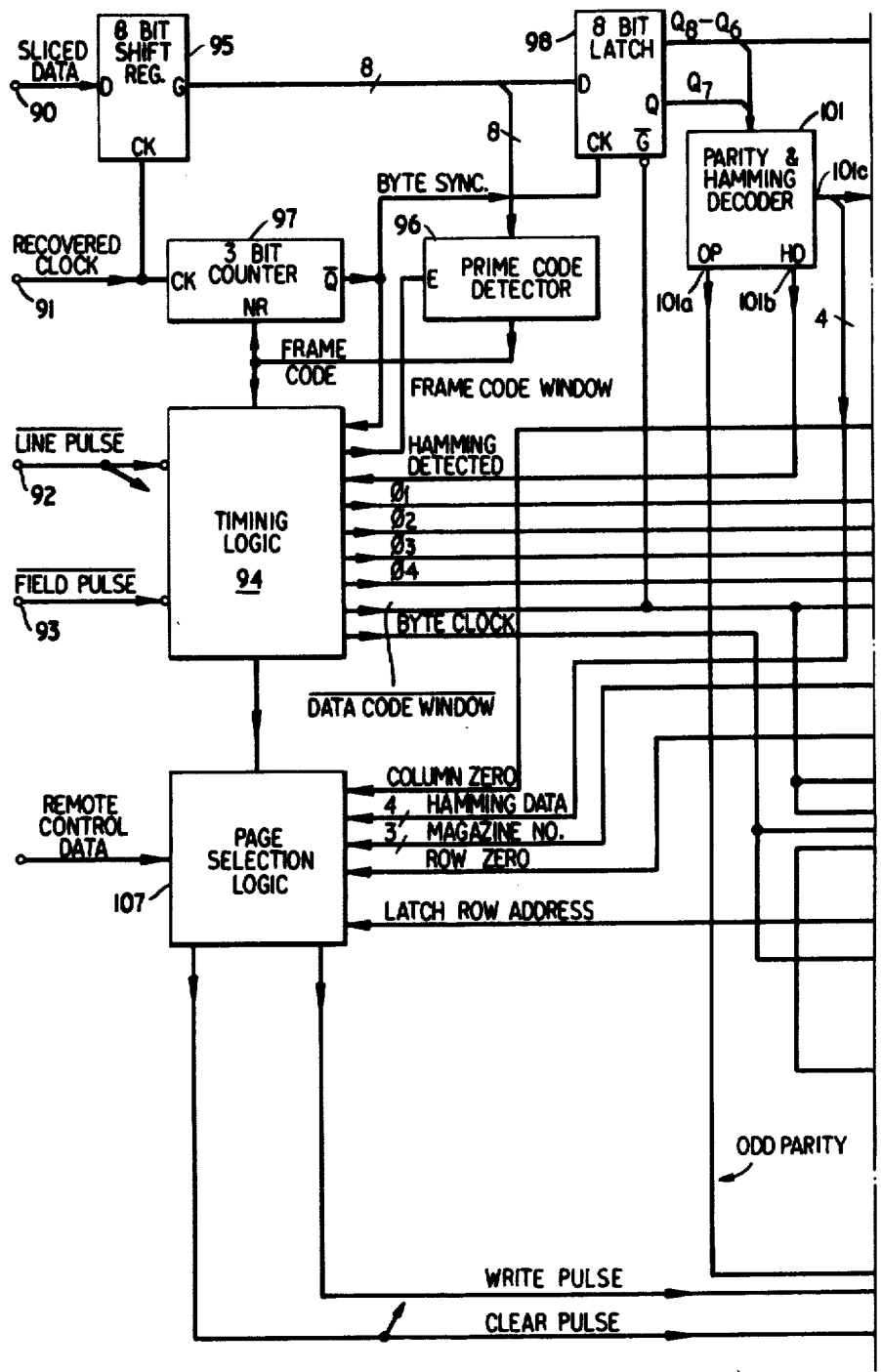
FIGS. 9a and 9b show in more detail a block/logic diagram similar to the basic diagram shown in FIG. 5.
Figure 9B:
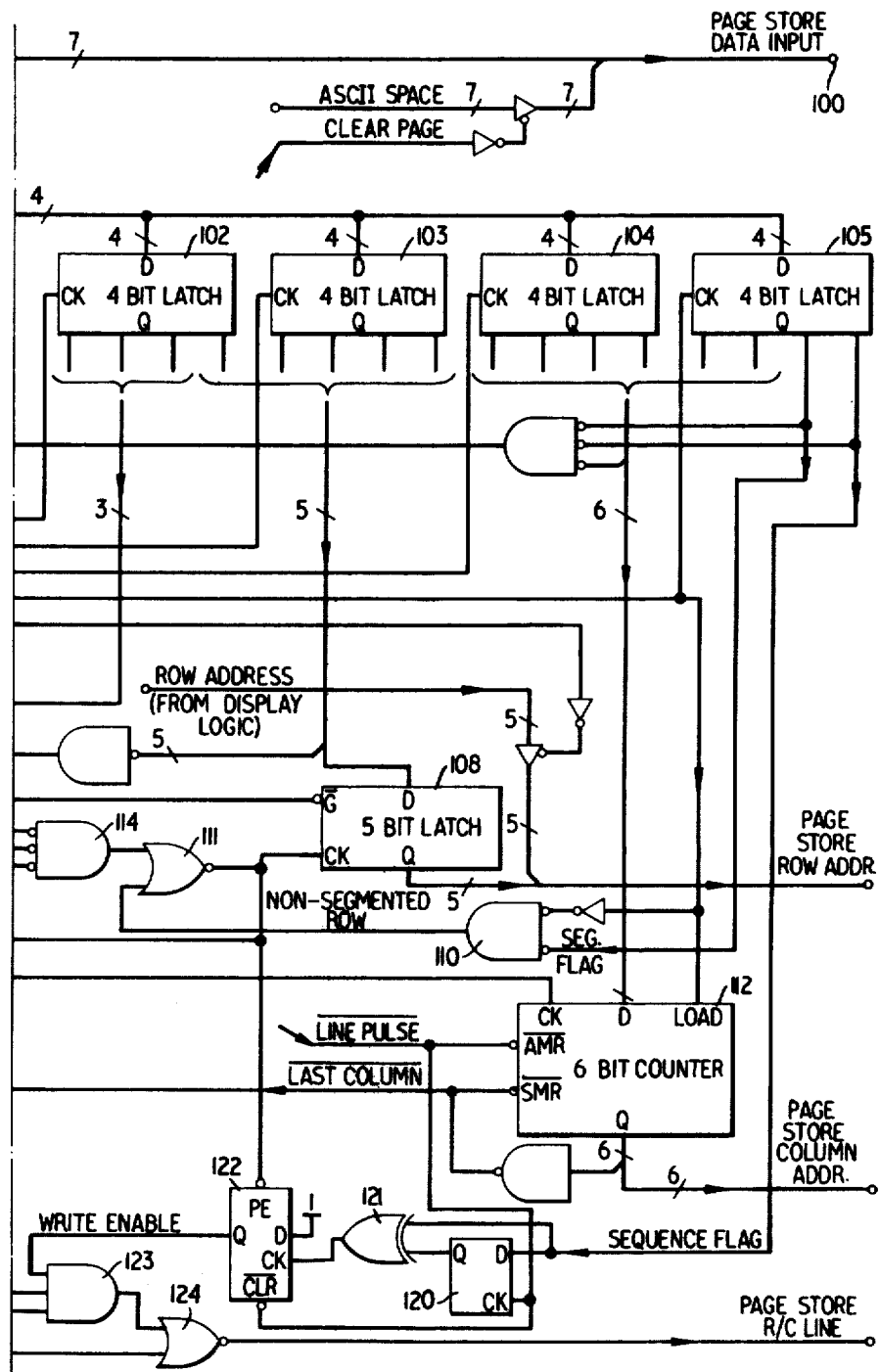

Referring now to FIGS. 9a and 9b, this shows a circuit akin to FIG. 5 but in more detail and for a general embodiment of the invention. It is assumed in FIG. 9 that the digital data has been separated from the incoming video signals. The separated digital data is fed as a series signal to input 90 of the circuit while the recovered clock signal from the data is fed to the input 91. Line and field sync pulses from the video part of the receiver are fed to the inputs 92 and 93 respectively of a timing logic circuit 94.

A byte synchronisation circuit for ensuring that the correct 8 serial bits are assembled in parallel into 8-bit digital words is constituted by an 8 bit shift register 95 whose input is connected to the input 90, a frame code detector circuit 96 and a 3-bit counter 97 which is clocked by the clock signal applied to input 91. The $\overline{Q}$ output of the counter 97 is used to clock the 8-bit latch once every 8 clock pulses of the clock on input 91 and the phase of the counter 97 is adjusted by the output of the detector 96. The result is that on correct detection of the frame code an 8-bit latch 98 is correctly clocked to latch the 8-bit data words.

Of the 8-bit words in the latch 98 only seven bits actually represent data and so only outputs $Q_0$–$Q_6$ are fed to a page store (not shown) via an input 100. However, all eight bits are required for the addressing code words and particularly the hamming protected codes thus all eight outputs of the latch are fed to a parity and hamming detector circuit 101. This circuit has three outputs, namely a first output 101a on which a signal appears when odd parity is detected; a second output 101b on which a signal appears when a hamming protected code is detected which output signal is fed to the timing logic circuit 94; and a four bit output 101c on which appears the detected hamming protected code word. The four bit word which appears on the output 101c is fed to whichever one of four latches 102, 103, 104, 105 is being clocked by a four phase clock signal generated by the timing logic circuit 94 on receipt of the signal from the output 101b. Thus, the first 4-bit code word is fed to the latch 102, the second to the latch 103, the third to the latch 104 and the fourth to the latch 105. In this embodiment the latch 102 stores the magazine number and one bit of the row number, the latch 103 stores the rest of the row number, the latch 104 stores the first four bits of a 6-bit column code while the latch 105 stores the last two bits of the column code plus the segmentation flag and the sequence flag.

A page selection logic circuit 107 is used to control the writing of data into the page store. The circuit 107 receives an input from a key pad operated by the user and which indicates which page is to be displayed. In order to ensure that the correct page is displayed the 4-bit hamming protected codes from the output 101c are fed to the circuit 107 as is the magazine number stored in the first three locations of the latch 102.

Each data line contains a display row address word for at least some of the data contained in that data line. Thus if the data in the data line relates only to one display row, the address is the address of that row. However, if the data line contains data related to two display rows, this is indicated by the presence of a segmentation flag (bit 3 of latch 105) and the address carried by the data line represents the address of the second of the two rows of data. In order to assign the data carried by the data line the correct locations in the page store, the 5-bit word constituting the row address is fed to a 5-bit latch 108. If the data in the data line all relates to one row of display, this is indicated by the segmentation flag indicating a non-segmented row via a NAND-gate 110 and a NOR-gate 111 and clocking the latch 108 to transfer the 5-bit row address held in the latch 108 to the page store as the row address for the data at the input 100.

If the data line is segmented, the latch 108 is not clocked immediately on receipt of the row address in the latches 102, 103. Thus on receipt of a segmented data line the first portion of the data fed to input 100 of the page store is fed to the address held in the latch 108 from the previous data line until a column counter in the form of a 6-bit counter 112 connected to the latches 104, 105 indicates that character locations in a row of display have been filled, i.e. all the columns have been received and a signal indicating the last column is used to clock the latch 108 via a NAND-gate 114 to change the row address for the next portion of the data in the data line. The 6-bit counter 112 is also providing column addresses for the data on the input 100 of the page store.

The above description assumes that all data is correctly received. Any data line whose addressing codes are not correct is ignored and hence a check must be maintained on the data being stored to ensure that it is correctly loaded into the store. Thus, if a segmented data line is incorrect all the data contained in that line is ignored. When the immediately succeeding data line is received, if it is correct, the first portion of its data has no correct address and must be ignored because the address in the latch 108 actually refers to the line immediately before the line ignored. This is achieved using the sequence flag stored in the latch 103. If the data is being correctly received the sequence flag will alternate with each received data line. This alternation is checked using a flip flop 120 and exclusive OR gate 121 and the output of the gate 121 is used to control writing of data into the page store and the clocking of the latch 108.

In order to achieve this control, the output of the gate 121 is fed to the clocking input of a flip flop 122 whose Q output is fed via an AND gate 123 to one input of a NOR gate 124. The presence of a logical 1 on the Q output of the flip flop 122 when in the presence of an odd parity signal from the output 101a of the circuit 101 and a write pulse from the page selection logic circuit 107 indicating that the page desired by the user is being received causes writing of the data on the input 100 into the page store at the addresses determined by the outputs from the latch 108 and counter 112.

When a data line has been ignored, the output of the gate 121 indicates that the sequence flag stored in the flip flop 120 is the same as the just received sequence flag. This causes the Q output to be removed and hence writing of the data at the start of the data line is inhibited until the 6-bit counter 112 which has been preloaded with the address of the column code for the first byte of data on the data line indicates the end of a row (last column) which clocks the latch 108 to allow the address in the latches 102,103 to be used by the page store and also pre-sets the flip flop 122 to a write enable condition to allow the second portion of the data on the data line and which is now presented to the input 100 to be loaded into the page store.

It is to be understood that the store is read out in a regular row-by-row manner at a speed suitable for display on a conventional T.V. receiver although it is being written in a somewhat irregular manner.

Figure 10A:
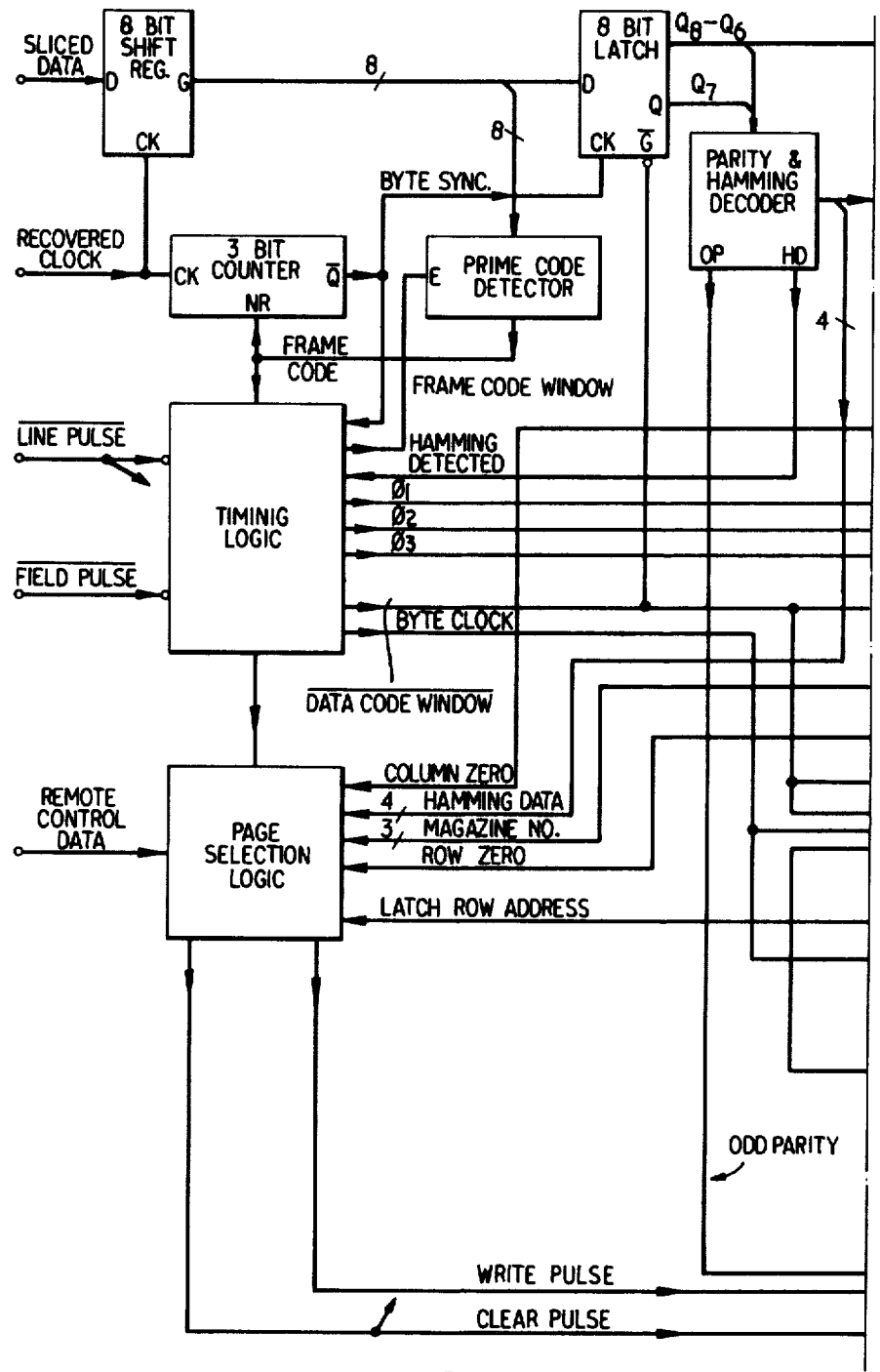
FIGS. 10a and 10b show a modification of the embodiment of FIGS. 9a and 9b.
Figure 10B:
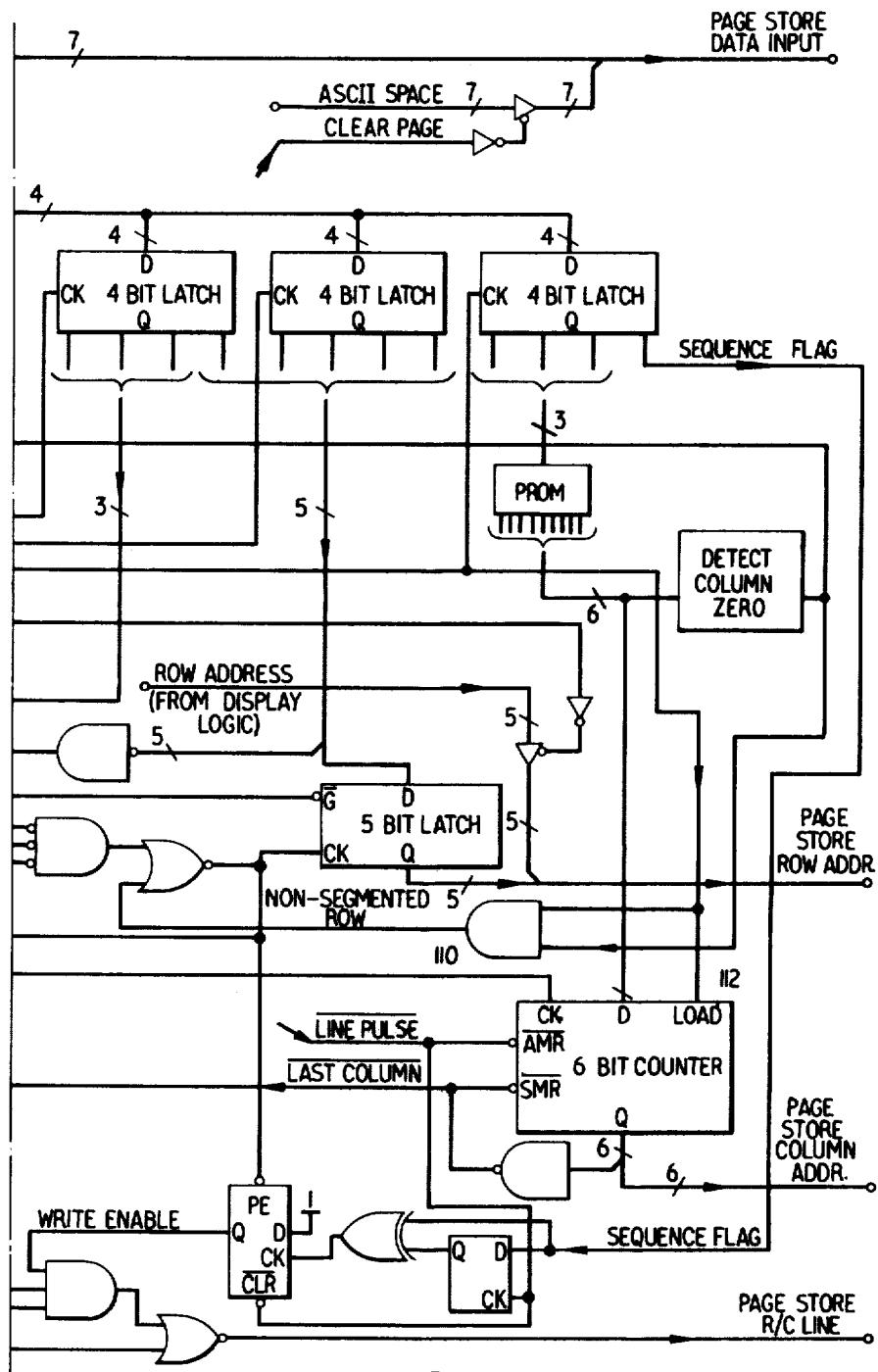

The above description is given in relation to the general embodiment of the invention which can be adapted to provide for any number of data words in a data line. If the number of data words is carefully chosen according to the guidelines given above, there can be a saving in components in the circuit shown in FIG. 9 and more efficient transmission of data can be achieved because the amount of addressing control data can be reduced to a minimum. Thus, in the case of 32 bits of data per data line for a 40 character display line the last two latches 104, 105 can be replaced by a single 4-bit latch because only three bits are required for the tab code since only 5 possible positions for the start of a segment of data are possible and so the 6-bit counter 112 is only required to be preloaded to one of five counts. The fourth bit of the 4-bit latch can be either the segmentation flag or the sequence flag although it is preferred to be the sequence flag. The flag, which is not actually transmitted can be derived from the 3-bit into tab code using suitable logic such as a PROM for detecting the particular tab code indicative of row zero. This alteration is shown in FIGS. 10a and 10b and will not be described in detail suffice to say that the use of a uniformly decrementing tab code assists in simplifying any such logic since the sequence flag is then the least significant digit of the tab code.

The above description is given on the basis that the original data uses simple non-return to zero (NRZ) signals. It is of even greater application where the digital data uses bi-phase signals.

The principles of transmitting a teletext system with any number of characters per data line to achieve a display of any number of characters per data line have been described. Such systems are termed tabulated teletext systems.

Tabulated teletext systems can be easily tailored to the data transmission capability rate of any given television system.

An example of a 32 character data line achieving a 40 character display has been given.

Either the 32 character per data line or one of the other preferred values given is almost bound to be suitable for teletext in the U.S.A.

What is claimed is:

1. A television receiver system for receiving digital information signals transmitted with a conventional wide band video signal to enable display of the information represented by the digital information signal in a display having predetermined numbers of rows and columns of characters, the information signals being transmitted in lines each of which contain data relating to a number of characters less than the predetermined number of columns in the display, comprising:

means for receiving the digital information signals separated from the wide band video signals;

means for storing said digital information signals for display in said predetermined numbers of rows and columns;

means for detecting in the digital information signals a tabulation control code indicative of the presence of digital information relating to two rows of the display in an information line and including row and column addressing codes and wherein said means for detecting includes row address and column address detecting means for respectively detecting the row and column addressing codes, means for retaining an immediately previous row address for a subsequently received data information line when said detecting means detects said control code, and wherein the column address detecting means controls the retaining means to change the row address to that received from said subsequently received data information line at a time determined by the detected column address received from said subsequently received data information line; and means for controlling the storage addressing of said digital information signals in said means for storing in accordance with said control code to ensure proper read out for display of the information.

2. A televison receiver system according to claim 1, and further comprising additional detecting means for detecting errors in the information signal lines to inhibit writing of incorrect information into said means for storing said digital information signals.

3. A television receiver system according to claim 1, wherein said detecting means further includes a logic circuit for detecting the presence of a single binary digit at a preselected location in said control code.

4. A television receiver system according to claim 1, wherein the control code is comprised within the column address and said detecting means further includes a logic circuit connected to said column address detecting means for deriving said control code from the column address.

5. A television receiver system according to claim 4, wherein said logic circuit includes means for detecting the column address indicative of the start of a row to indicate the presence of information relating to only one row.

6. A television system according to claim 1, wherein the column address contains information concerning the correct sequence of lines of the information signals and further comprising a logic circuit connected to said column address detecting means for deriving a control signal from said column address code for the detection of errors.

7. A television receiver system according to claim 6, wherein said logic circuit includes means for monitoring the least significant digit of the column address code.

* * * * *